United States Patent
Hu

(10) Patent No.: US 7,392,438 B2
(45) Date of Patent: Jun. 24, 2008

(54) AUTOMATIC SAFETY TEST SYSTEM

(75) Inventor: Jen-Yao Hu, Yongkang (TW)

(73) Assignee: FSP Technology Inc., Taoyuan Hsien (TW)

( * ) Notice: Subject to any disclaimer, the term of this patent is extended or adjusted under 35 U.S.C. 154(b) by 615 days.

(21) Appl. No.: 10/995,352

(22) Filed: Nov. 24, 2004

(65) Prior Publication Data

US 2006/0129887 A1    Jun. 15, 2006

(51) Int. Cl.
*G06F 11/00* (2006.01)
*G01R 31/28* (2006.01)
*G01D 3/00* (2006.01)
*G01R 27/28* (2006.01)
*G01L 15/00* (2006.01)

(52) U.S. Cl. .............. 714/703; 714/742; 702/108; 702/118; 702/121

(58) Field of Classification Search .............. None
See application file for complete search history.

(56) References Cited

U.S. PATENT DOCUMENTS

| | | | | |
|---|---|---|---|---|
| 7,017,087 | B2 * | 3/2006 | Panis et al. ............. | 714/716 |
| 7,100,092 | B2 * | 8/2006 | Allred et al. ............ | 714/43 |
| 7,242,209 | B2 * | 7/2007 | Roberts et al. .......... | 324/765 |
| 2006/0100841 | A1 * | 5/2006 | Wu et al. ................ | 703/20 |
| 2006/0123304 | A1 * | 6/2006 | Panis et al. ............. | 714/742 |

* cited by examiner

*Primary Examiner*—Phung Vy Chung
(74) *Attorney, Agent, or Firm*—Muncy, Geissler, Olds, & Lowe, PLLC

(57) ABSTRACT

An automatic safety test system, which comprises a control interface of a control unit for controlling the switching of a switch in a server unit and automatically switching to a specified testing point of an electronic product, and connects a bus interface of the control unit to a plurality of testing instruments for sending the values measured by the testing instrument at the specified testing point to a communication interface record of the control unit through the bus interface. Therefore, the automatic safety test system of the invention can automatically test every specific safety testing item at each testing point of the electronic product, and thus further achieves the objectives of saving time, manpower and resources.

12 Claims, 2 Drawing Sheets

AUTOMATIC SAFETY TEST SYSTEM

FIELD OF THE INVENTION

The present invention generally relates to safety test systems, more particularly to an automatic safety test system for carrying out an automatic safety test.

BACKGROUND OF THE INVENTION

As the electronic industry advances rapidly, electronic products sold in the market, regardless of their quality, quantity or type are changing day after day. However, most of us emphasize on the powerful functions and high performance of the electronic products and neglect the importance of the safety of the electronic products. To assure consumers' safety, many safety tests are required for testing electronic products.

A safety test generally includes the testing items such as the AC/DC, extra high voltage, high-power voltage resistance, insulated resistor, grounding resistor, dynamic electric leak of an electronic finished goods, semi-finished goods and electronic components. The safety test also simulates the insulation deterioration of the electronic products to discover any problem such as electric shock, sparking and overheat and helps manufacturers to obtain certifications for the related international safety regulations such as UL, TUV and CE, etc. as to globalize their markets of electronic products and allow consumers to use electronic products safety with peace of mind. Therefore, safety tests are definitely important.

It is noteworthy that each testing item of the present safety test is performed manually and their measured results are recorded to determine whether or not a product goes beyond an international standard specification. In other words, the safety test taken at each testing point of an electronic product is performed manually and sequentially. Such arrangement requires a great deal of manpower to control and execute the test, and obviously consumes lots of time. Therefore, a way of reducing the testing time and saving manpower to optimize the efficiency of safety tests demands manufacturers' immediate attention and a feasible solution.

SUMMARY OF THE INVENTION

The primary objective of the present invention is to provide an automatic safety test system capable of automatically testing the properties of an electronic product at every testing point to achieve the objectives of saving time, manpower and resources and further assure the electronic product complies with each safety regulation.

To achieve the foregoing objectives, the present invention provides an automatic safety test system for testing the properties of electronic products at every testing point and the invention comprises a control unit, a server unit, a power supply unit and a plurality of testing instruments. The control unit has a first control interface, a communication interface and a bus interface; wherein the first control interface provides a select signal to the server unit, and the server unit has a second control interface and a switch, and the switch is electrically coupled to the testing points of an electronic product. The second control interface receives the select signal of the first control interface and sends the select signal to the switch, and the switch switches to the selected testing point. The power supply unit is electrically coupled to the electronic product and such power supply unit supplies power required for testing the electronic product according to the command given by the first control interface of the control unit. Each testing instrument is used to test different items for the safety test and electrically coupled to the testing points of the electronic product, and the testing instrument is electrically coupled to the communication interface through the bus interface and receives the values of the electronic product measured by the testing instruments.

Other features and advantages of the present invention will become apparent in the following detailed description of the preferred embodiments with reference to the accompanying drawings.

DETAILED DESCRIPTION OF THE PREFERRED EMBODIMENTS

To make it easier for our examiner to understand the objective of the present invention, its structure, innovative features, and performance, we use a preferred embodiment together with the attached drawings for a detailed description of the invention.

Figure 1:
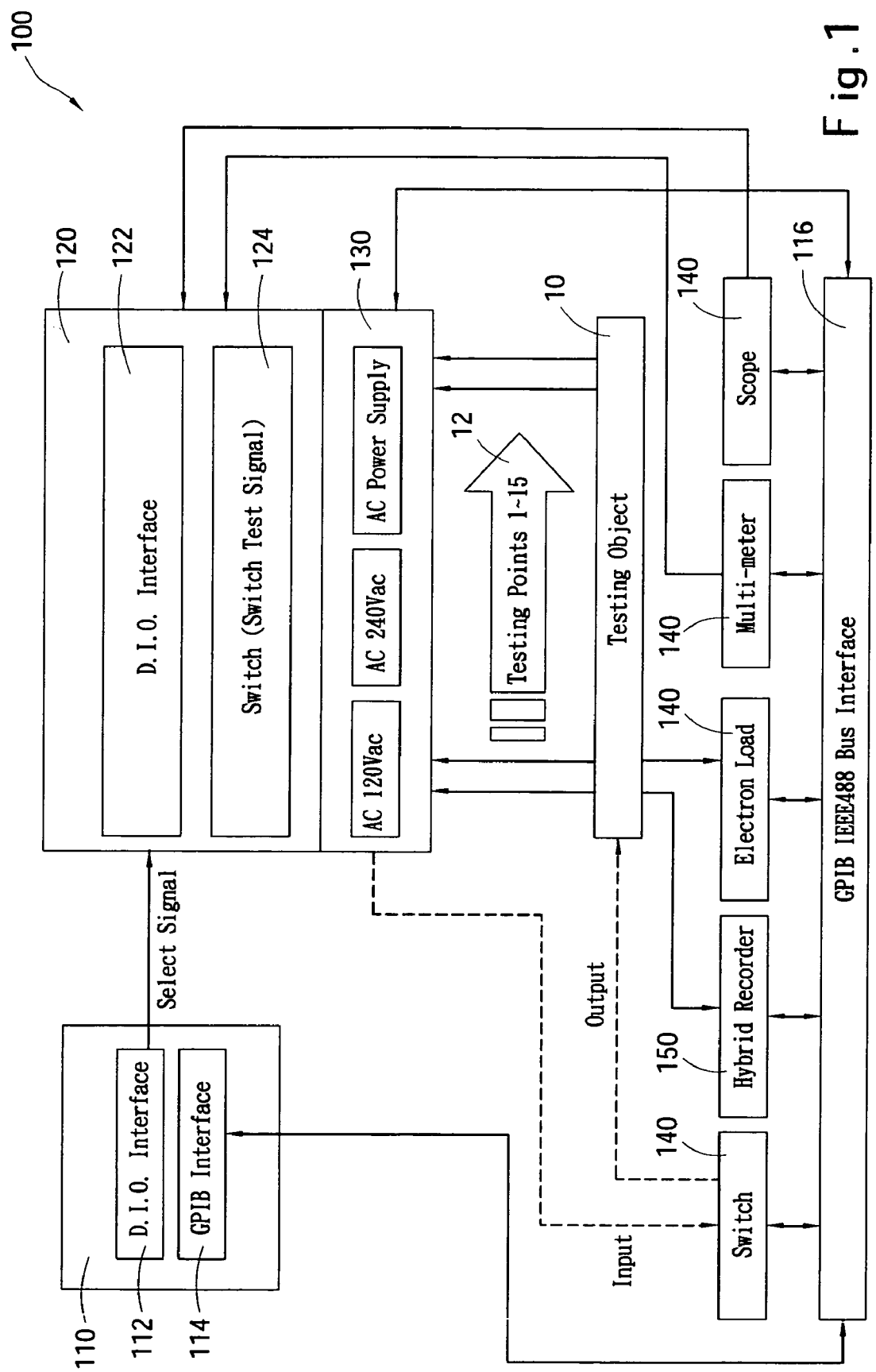
FIG. 1 is a structural block diagram of the automatic safety test system of the present invention.

Please refer to FIG. 1 for the structural block diagram of the automatic safety test system of the present invention. In FIG. 1, the automatic safety test system 100 is applicable for testing each electric property of an electronic product 10 (which is the testing object) to comply with each of the safety regulation, wherein the electronic product 10 such as an information product and a video product, etc, and such electronic product 10 has several testing points 12 for the testing. These testing points 12 are set at different positions according to different testing items. For example, if the safety of the power supply of the electronic product 10 is tested, these testing points 12 will be set at the input or the output of the power supply of the electronic product 10.

The automatic safety test system 100 comprises a control unit 110, a server unit 120, a power supply unit 130, and a plurality of testing instruments 140. The control unit 110 has a first control interface 112, a communication interface 114 and a bus interface 116; wherein the control unit 110 is a personal computer (PC) for example, and the first control interface 112 is used for providing a select signal to the server unit 120. For example, the first control interface 112 is a Digital Input Output (DIO) interface; the communication interface 114 could be a General Purpose Interface Bus (GPIB) interface (which is used in this embodiment), a RS-232 interface or a TCP/IP communication protocol; and the bus interface 116 could be a GPIP IEEE488 bus interface (which is used in this embodiment), a RS-232 bus interface or a TCP/IP communication protocol.

The server unit 120 has a second control interface 122 and a switch 124, and the switch 124 is electrically coupled to the testing points 12 of the electronic product 10; wherein the second control interface 122 is used for receiving the select signal of the first control interface 112 and sending the select signal to the switch 124, and the switch 124 switches to the testing point 12 specified by the control unit 110. In this embodiment, the second control interface 122 could be a DIO interface and the switch 124 could be a relay board.

The power supply unit 130 is electrically coupled to the electronic product 10, and the power supply 140 supplies the power required for testing the electronic product 10 according to the command given by the first control interface 112 of the control unit 110. In other words, the first control interface 112 of the control unit 110 sends a signal to the server unit 120, and the second control interface 122 of the server unit 120 receives the signal, and the second control interface 122 sends the command of the first control interface 112 to the power supply unit 130, so that the power supply unit 130 will provide the power required for testing the electronic product 10. For example, the power supply unit 130 provides a direct current (DC) or an alternate current (AC) according to the power supply specification of the electronic product 10, or provides different voltages (such as 120 Va or 240 Va) according to the voltage specification of the electronic product 10.

In the plurality of testing instruments 140, each testing instrument 140 is applicable for different testing items for testing the properties of different electric appliances. These testing instruments 140 include a power meter, an electronic load, a multi-meter or a scope, etc. These testing instruments 140 are electrically connected to the testing points 12 (such as an electronic load) of the electronic product 10 directly according to the different safety testing items or electrically connected to the testing points 12 (such as a power meter, a multi-meter or a scope) indirectly through the server unit 120. Further, each testing instrument 140 makes use of the electric connection between the bus interface 116 and the communication interface 114 of the control unit 110 to receive the values of the electronic product 10 measured by the corresponding testing instrument 140.

Figure 2:
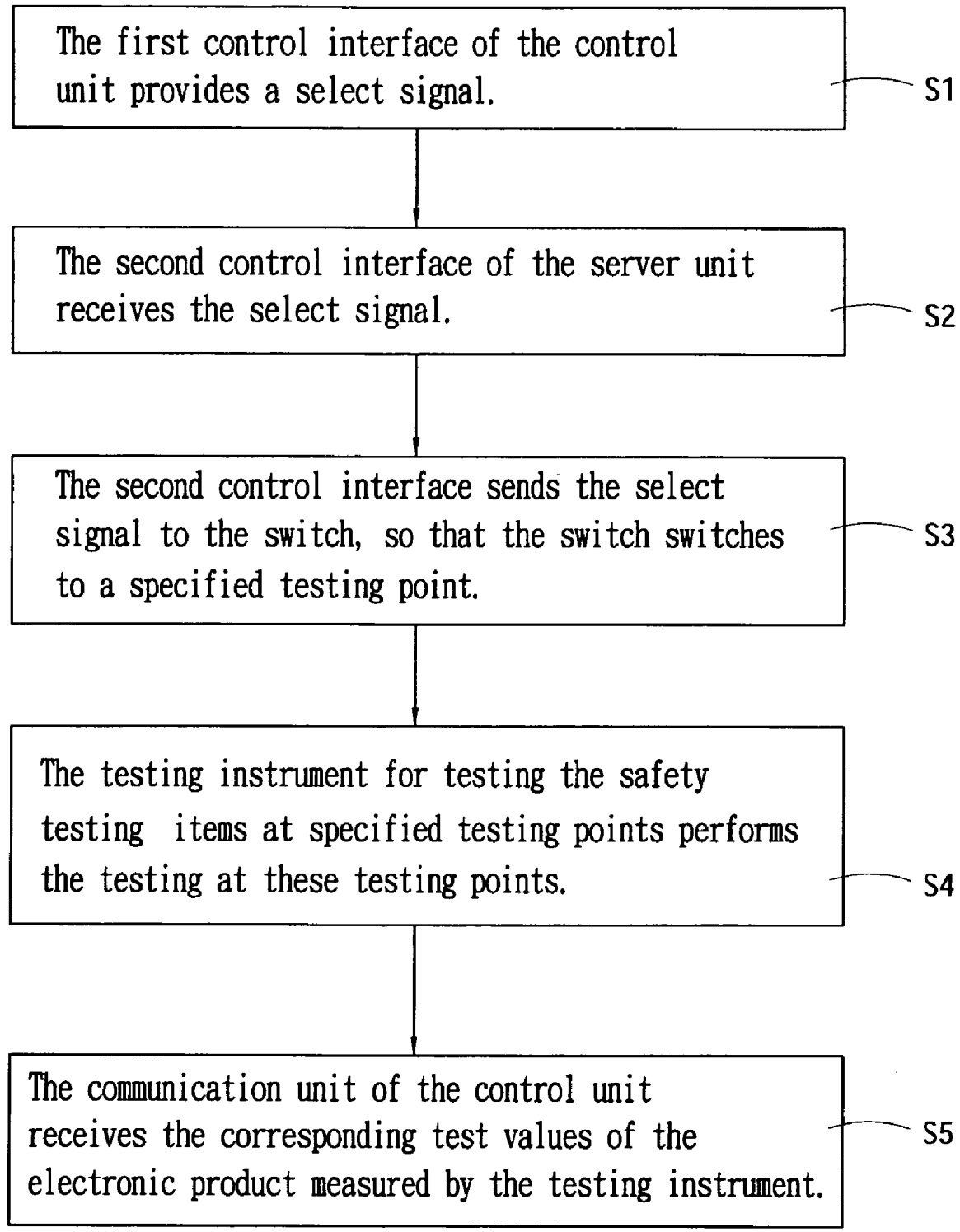
FIG. 2 is a flow chart of the automatic safety test system of the present invention.

Please refer to FIG. 2 for the flow chart of the automatic safety test system of the present invention. The automatic safety test system of the present invention carries out a safety test which comprises the steps of: (Step 1) the first control interface of the control unit providing a select signal; (Step 2) the second control interface of the server unit receiving the select signal; (Step 3) the second control interface sending the select signal to the switch, so that the switch switches to a specified testing point 12; (Step 4) the testing instrument for testing the safety testing items at specified testing points 12 performing the testing at these testing points 12; and (Step 5) the communication unit of the control unit receiving the corresponding test values of the electronic product measured by the testing instrument.

Please refer to FIGS. 1 and 2. Assumed that a testing point 12 at the output end of the power supply of the electronic product 10 is tested or an "electron load" status of the electronic product 10 is tested, the first control interface 112 of the control unit 110 will provide a select signal to the server unit 120, and the second control interface 122 of the server unit 120 will receive this select signal, and will send this select signal to the switch 124, and then the switch 124 will switch to the testing point 12 specified by the electronic product 10. The testing instrument (which is an electron loader) specified for testing the safety item will carry out the testing at this testing point 12. Finally, this testing instrument 140 will receive the testing values of the electronic product 10 measured by the testing instrument 140 through the bus interface 116.

In view of the description above, the automatic safety test system 100 of the present invention makes use of the first control interface 112 of the control unit 110 to work with the second control interface 122 and the switch 124 in the server unit 120 to automatically switch to the selected testing point 12 of the electronic product 10. In addition, the control unit 110 of the present invention adopts the bus interface 116, therefore the control unit 110 can connect a plurality of testing instruments 140 and receive the testing values of the electronic product 10 measured by the testing instruments 140 through the bus interface 116. Therefore, the present invention can automatically test the properties of the electronic product 10 at each testing point 12 to assure that the electronic product can comply with each safety regulation and can further achieve the objectives of saving time, manpower and resources.

Please refer to FIG. 1 again. The automatic safety test system 110 of the invention can selectively adopt a hybrid recorder 150. The hybrid recorder 150 is electrically connected to the electronic product 10, and also electrically connected to the communication interface 114 of the control unit 110 through the bus interface 116 for recording the testing values obtained after testing the electronic product 10 by these testing instruments 140. In other words, the hybrid recorder 150 responds to the results obtained from each testing item at each testing point 12 of the electronic product 10 as a basis for determining whether or not the electronic product 10 complies with each safety regulation. Of course, the persons skilled in the art should know that the automatic safety test system 100 of the invention is not limited only to each safety test for a plurality of testing points 12 on the electronic product 10, but it can also be applied to each safety test for a plurality of testing points 12 on many lots of electronic product 10, and respond to the result of each testing item of each lot of electronic products 10.

In summation of the foregoing description, the automatic safety test system of the invention has the following advantages:

1. The invention can automatically test each electric property of an electronic product to assure that the electronic product complies with each safety regulation and further achieves the objectives of saving time, labor and resources.

2. The invention can connect with a plurality of testing instruments for testing the electronic product at specified testing points 12 and receiving its test values.

3. The invention can automatically switch to the testing point 12 selected for the electronic product, and achieve the objective of automatically testing the electronic product at many testing points 12.

4. The invention can respond to the results for each testing item obtained after testing each testing point 12 of the electronic product as a basis of determining whether or not the electronic product complies with each safety regulation.

What is claimed is:

1. An automatic safety test system, for measuring an electric property of at least one electronic product, and said electronic product having a plurality of testing instruments for a safety test, said automatic safety test system comprising:

a control unit, having a first control interface, a communication interface and a bus interface, wherein said first control interface is used for providing a select signal;

a server unit, having a second control interface and a switch, said switch being electrically coupled to a plurality of testing points of said electronic product, wherein said second control interface is used for receiving said select signal of said first control interface and sending said select signal to said switch, and said switch switching to one of said testing points;

a power supply unit, being electrically coupled to said electronic product and supplying power required for testing said electronic product according to said first control interface of said control unit; and a plurality of testing instruments, each being used for testing an item of a different electric property and said testing instrument being electrically coupled to said testing points of said electronic product, and said testing instruments being electrically coupled to said communication interface through said bus interface for receiving the test values of said electronic product measured by said testing instruments.

2. The automatic safety test system of claim 1, wherein said control unit is a personal computer.

3. The automatic safety test system of claim 1, wherein said first control interface is a digital input output (DIO) interface.

4. The automatic safety test system of claim 1, wherein said second control interface is a digital input output (DIO) interface.

5. The automatic safety test system of claim 1, wherein said communication interface is one selected from the collections of a general purpose interface bus (GBIB) interface, a RS-232 interface and a TCP/IP communication protocol.

6. The automatic safety test system of claim 1, wherein said bus interface is one selected from the collection of a general purpose interface bus (GBIB) IEEE488 interface, a RS-232 interface and a TCP/IP communication protocol.

7. The automatic safety test system of claim 1, wherein said switch is a relay board.

8. The automatic safety test system of claim 1, wherein said testing instruments are electrically coupled to said testing points of said electronic product through said server unit.

9. The automatic safety test system of claim 1, wherein said testing instrument is one selected from the collection of a power meter, an electronic load, a multi-meter and a scope.

10. The automatic safety test system of claim 1 further comprising a hybrid recorder being electrically coupled to said electronic product and electrically coupled to said communication interface through said bus interface for recording the test values measured after testing said electronic product by said testing instrument.

11. The automatic safety test system of claim 1, wherein said power supply unit supplies an alternate current (AC) power.

12. The automatic safety test system of claim 1, wherein said power supply unit supplies a direct current (DC) power.

* * * * *